US006872136B1

(12) United States Patent
Bennett

(10) Patent No.: US 6,872,136 B1
(45) Date of Patent: Mar. 29, 2005

(54) CORN HUSKING AND SHELLING APPARATUS AND METHOD

(76) Inventor: Kevis Bennett, 165 Pineneedle Rd., Douglas, GA (US) 31535

( * ) Notice: Subject to any disclaimer, the term of this patent is extended or adjusted under 35 U.S.C. 154(b) by 172 days.

(21) Appl. No.: 10/065,204

(22) Filed: Sep. 25, 2002

(51) Int. Cl.[7] .............................. A01F 11/06; B02B 3/08
(52) U.S. Cl. .............................. 460/51; 460/52; 460/54
(58) Field of Search .............................. 30/121.5, 124, 30/287, 296.1, 123.5, 337, 329, 342; 460/38, 460/39, 40, 45, 46, 48, 49, 50, 51, 52, 54, 460/55, 56, 57, 58; 99/589, 588, 584, 567, 99/514

(56) References Cited

U.S. PATENT DOCUMENTS

| 4,885,842 A | 12/1989 | Marley ...................... 30/121.5 |
| 5,664,278 A | 9/1997 | Reisman ...................... 15/160 |
| 6,305,267 B1 | 10/2001 | Backus ........................ 99/514 |

*Primary Examiner*—Árpád Fábián Kovács
(74) *Attorney, Agent, or Firm*—Rigoon Patents & Engineering, P.C.; Jonathan R. Smith

(57) ABSTRACT

An ear of corn attached to a power driver such as a drill can be husked and or creamed in a two-step process without detaching the ear from the driver. The shelling device uses a spring-biased grater inside a tube to cut the kernels from the cob, and may be used alone or in combination with the husking device. If desired, the two devices can be connected using an ergonomically designed bracket and used sequentially.

7 Claims, 12 Drawing Sheets

CORN HUSKING AND SHELLING APPARATUS AND METHOD

BACKGROUND OF INVENTION

This invention is in the general field of grain processing, more particularly as it relates to removing the edible portion of the grain from the inedible portion after harvesting. Still more particularly it relates to devices and methods for removing husks from ears of corn and removing corn kernels from the cobs, especially such devices and methods which are power-driven.

Prior art in this field includes generally two separate devices or methods; one for removing the corn husk and silk from the corn ears ("husking") and another for removing the kernels from the cob. The latter process is generally referred to as "shelling" or "stripping", and involves a greater or lesser degree of piercing of the kernel wall depending on how the kernel is separated from the cob.

Husking of the corn ear is a mechanical process in which the husk is pulled or brushed from the ear. The husk can be pulled downward from the free end of the ear and torn off at the butt by grasping the leaves manually, or it can be brushed or rubbed off with toothed, bristled, or abrasive surfaces or simple frictional contact with certain surfaces. Special additional means may be included to brush or pick the silk from the ear after the husk is removed.

Shelling of the corn is generally also a mechanical process in which the kernels are cut or scraped off the cob. If whole kernel corn is desired, it is necessary to detach each kernel from the cob at or near its point of attachment to the cob without puncturing the kernel wall. This may be accomplished with a knife blade applied at the base of the kernels and moved parallel to the longitudinal axis of the ear.

If the kernel wall is ruptured extensively during the shelling process, a substantial amount of the paste, or cream, within is released along with the kernels. This mixture is creamed corn, produced to a greater or lesser extent depending on the degree of kernel rupturing. Some creaming occurs when the corn is shelled by scraping the tops of the kernels first and moving downward toward the cob. The degree of rupture of the kernel walls is affected by the speed and direction of scraping and the shape of the scraping implement. In this patent specification, the process of removing the kernel material from the ear, regardless of degree, is referred to as "shelling".

Finally, the kernel material, cobs and husks are typically handled separately for further processing whether it be by hand or by machine.

SUMMARY OF INVENTION

In one embodiment, this invention provides a new apparatus for shelling or creaming corn using a power driver such as an electric drill. In another, preferred, embodiment, it provides an apparatus and method in which corn ears can be efficiently both husked and shelled in sequence and in tandem, one-by-one, using a power driver. To use either embodiment, a special mandrel is first affixed to an electric drill. Then the mandrel is screwed into the bottom end of an ear of corn that has been debutted. The mandrel with an unhusked corn ear thus affixed and revolved by the drill can then be husked by inserting the ear into the husking portion of the invention. The husking portion is configured to efficiently remove and dispose of both the husk and the corn silk. A husked ear can be shelled or creamed by inserting a husked ear, again on the revolving mandrel, into the shelling portion of the invention. This portion is configured to efficiently remove the kernel material from the cob.

It is an object of this invention to provide an apparatus and method that increases the speed, ease, and efficiency of husking, shelling or creaming corn compared with existing methods. It is an object of the invention specifically to improve the efficiency of corn silk removal and recovery of desirable food. It is a further object of this invention to provide these features in a single portable and inexpensive device. Still another object of the invention is to provide an apparatus for husking, shelling or creaming corn that is comprised of few parts and can be cleaned and maintained easily.

DETAILED DESCRIPTION

Figure 1:
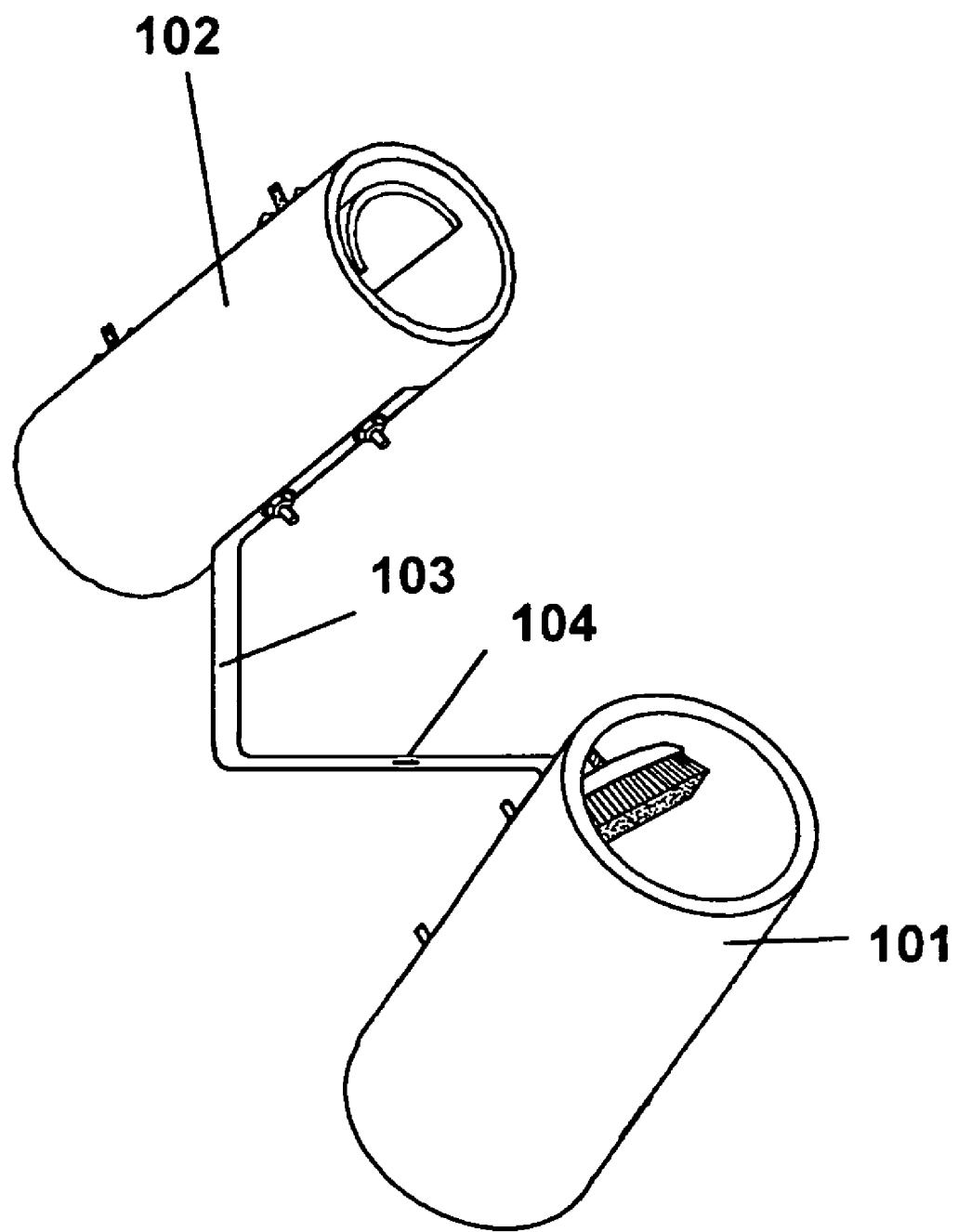
FIG. 1 is a perspective view of the preferred embodiment of the invented apparatus.

Referring now in greater detail to the drawings, in which like elements are referred to by like reference numerals in each figure, FIG. 1 is a perspective view of the preferred embodiment of the invented apparatus. It shows a lower husking tube 101 and an upper shelling tube 102 connected by a mounting bracket 103. The two tubes are comprised of open-ended cylinders, and the mounting bracket is a shaped flat bar. In the preferred embodiment of the invention, the mounting bracket is rigid metal with a hole 104 near its midpoint to enable fastening to a stationary object (not shown). In the preferred embodiment, the cylindrical parts are formed from thermoplastic pipe. The invented method comprises setting up an ear of corn on a power driver (not shown), inserting a revolving ear of corn first in the husking tube 101, and then inserting it in the shelling tube 102.

Figure 2:
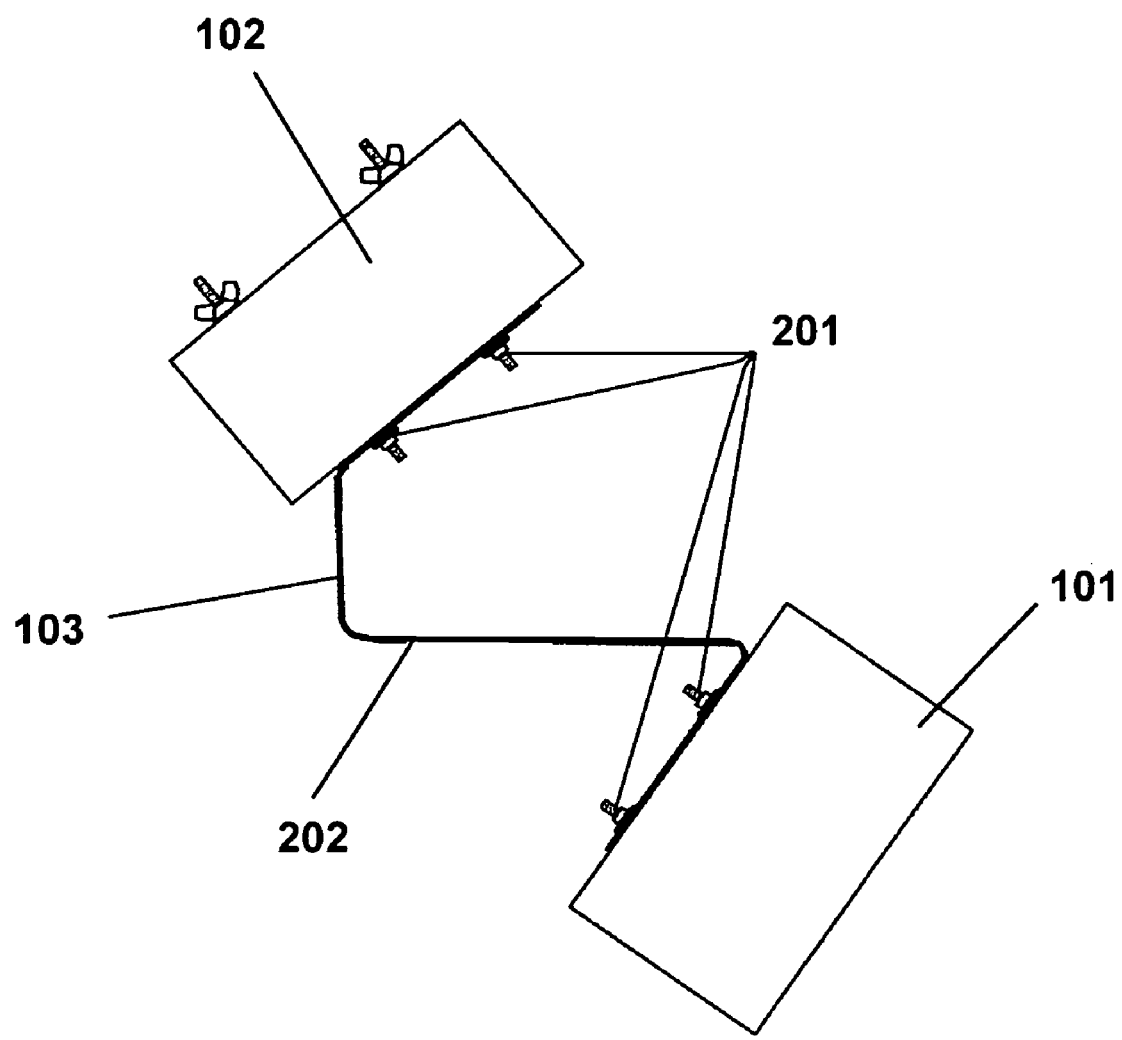
FIG. 2 is a side view of the preferred embodiment.

FIG. 2 is a side view of the preferred embodiment, showing that the bracket 103 in this embodiment can be fastened to the two tubes using two conventional fasteners 201 each. The bracket is bent so as to align the tubes nearly parallel and create a horizontal section 202.

Figure 3:
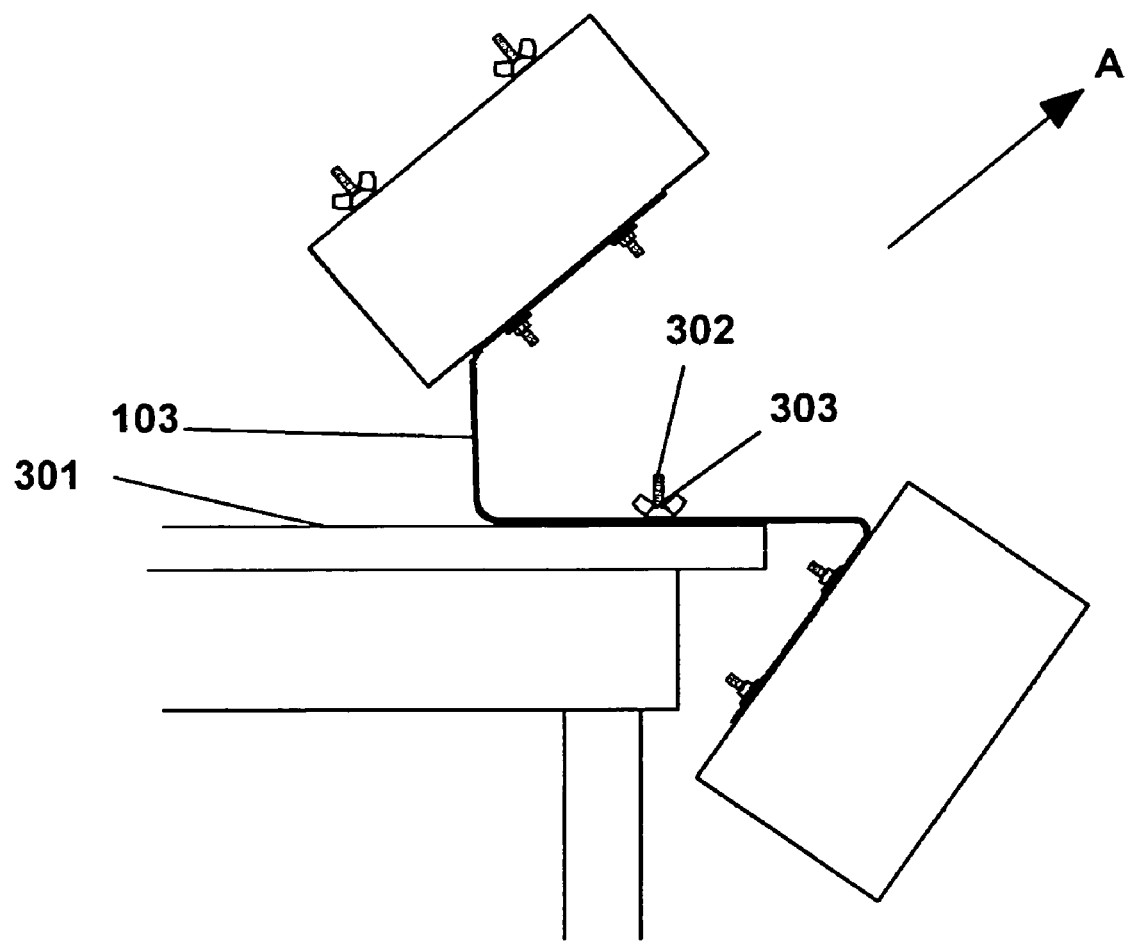
FIG. 3 is a side view of the preferred embodiment secured to a table top.

FIG. 3 is a side view of the preferred embodiment secured to a table top 301 by a stud 302 and a wing nut 303. Note that when the apparatus is so affixed, the axes of the tubes are oriented by the bracket 103 to converge at a point to the upper right of the Figure (arrow A). This is so that the user can conveniently access the upper end of either tube with a minimum of motion.

Figure 4:
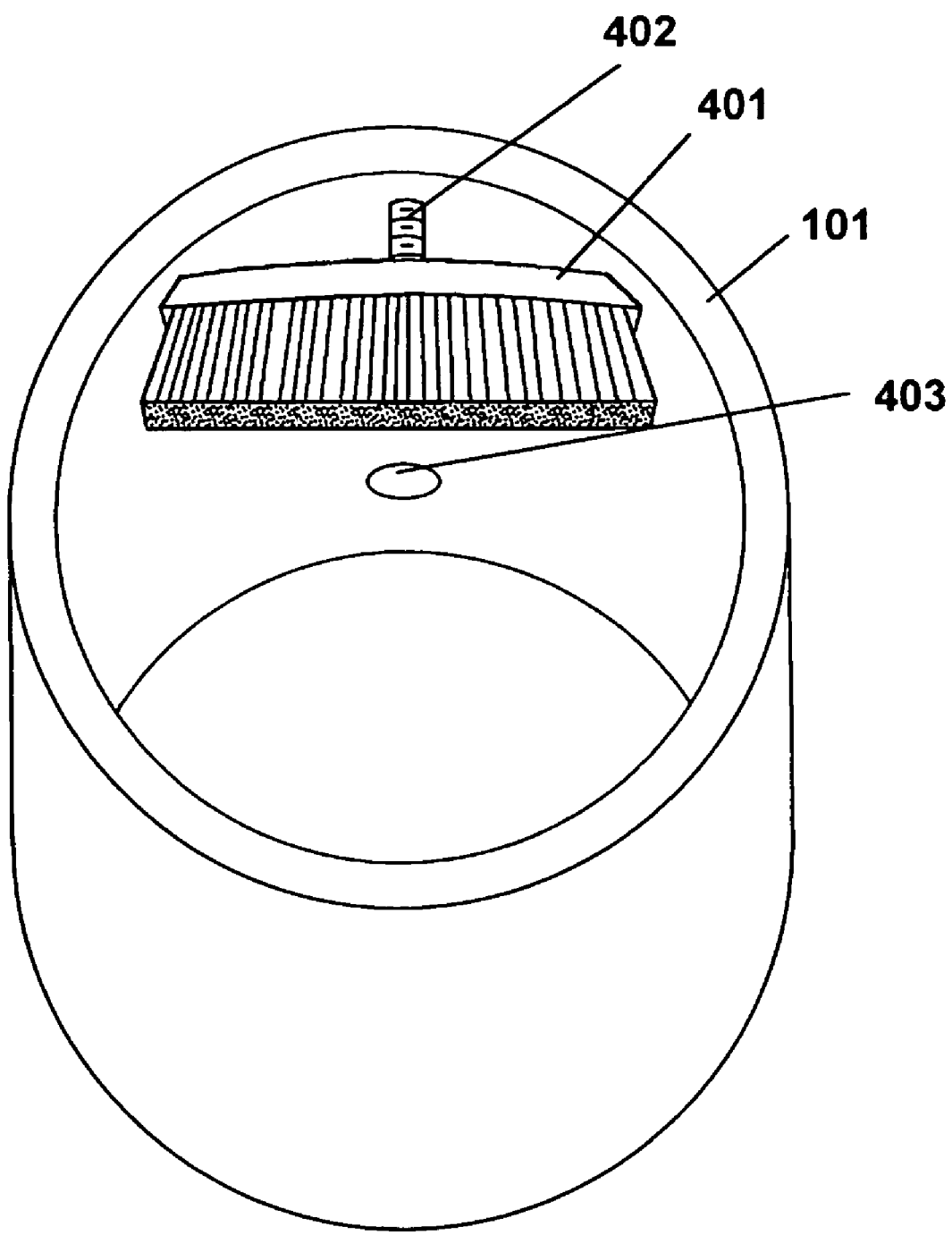
FIG. 4 is a front view of the husking tube of the preferred embodiment.

FIG. 4 is a front view of the husking tube 101 of the preferred embodiment. It comprises a flat, stiff-bristled brush 401 fastened to the inner wall of the tube by a screw 402 so that the bristles of the brush 401 face the center of the tube. In this view the brush 401 is fastened at its midpoint to the top of the tube 101, but other orientations of the brush relative to the tube may be used effectively within the scope of this invention. Also visible in this view is one of the two bracket mounting holes 403.

Figure 5:
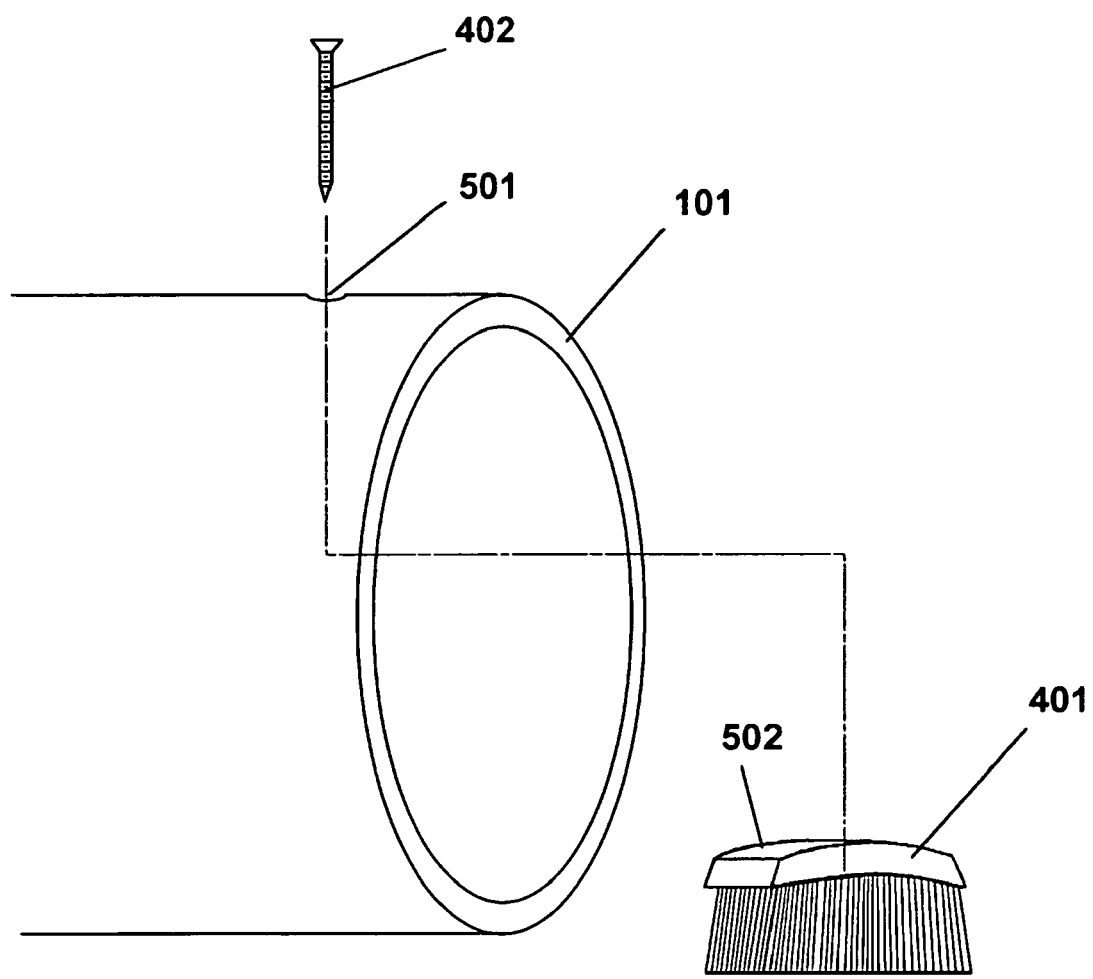
FIG. 5 is an exploded view of the husking tube.

FIG. 5 is an exploded view of the husking tube 101 showing how this portion of the preferred embodiment is assembled. Screw 402 is passed through hole 501 and screwed into the upper surface 502 of the brush 401.

Figure 6:
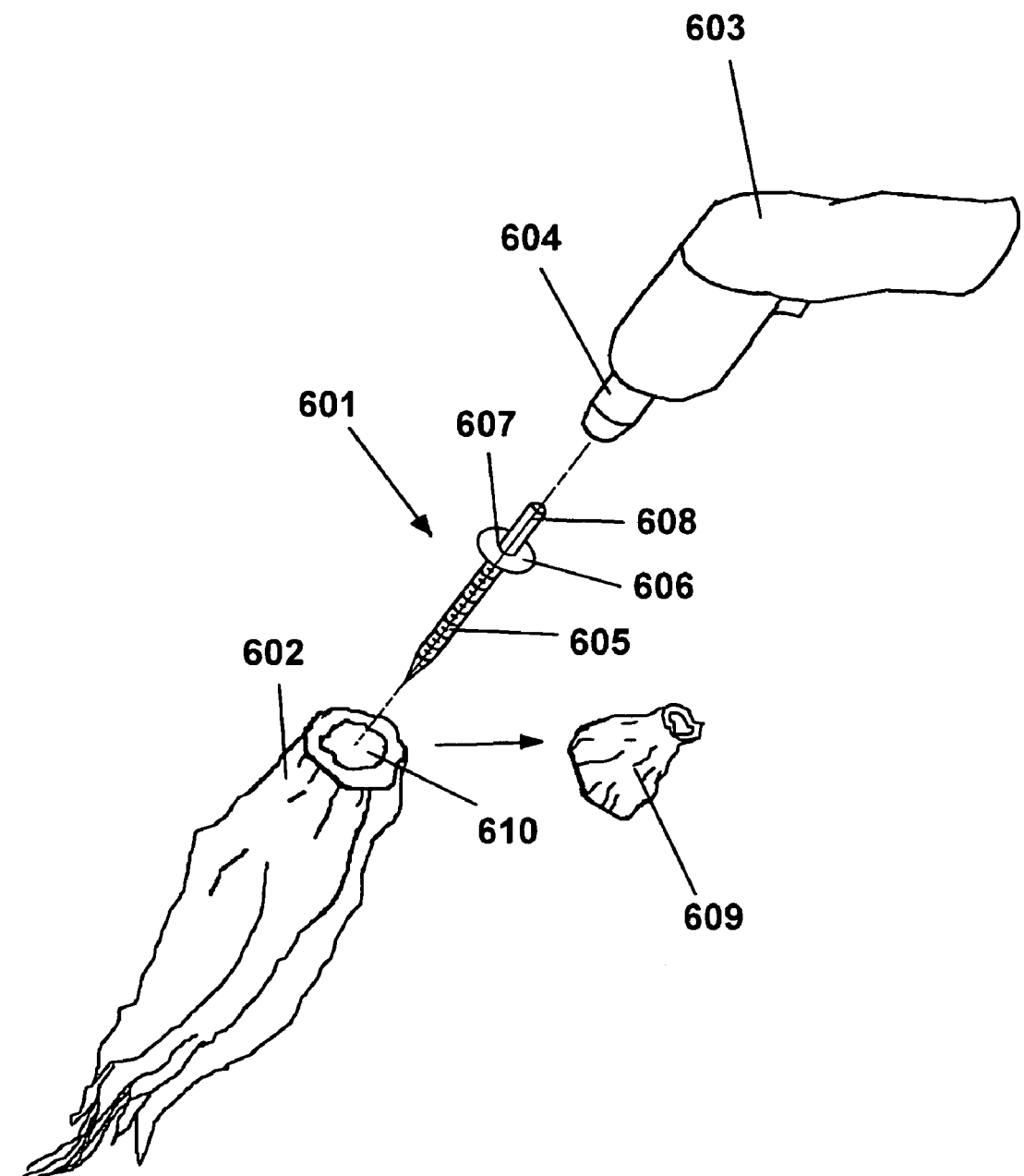
FIG. 6 is a perspective view of the special mandrel of the preferred embodiment in exploded relation to an ear of corn and an electric drill used as a driver.

FIG. 6 is a perspective view of the special mandrel 601 of the preferred embodiment in exploded relation to an ear of corn 602 and an electric drill 603 used as a driver. To use this invention effectively, it is necessary to secure the ear to the drill so that the ear is coaxial with the axis of the drill chuck 604 and rotates in fixed relation to the chuck. In the preferred embodiment, the mandrel 601 consists of a headless lag screw 605 with a collar 606 permanently fixed perpendicularly to it at the bottom 607 of the lag portion 608 of the screw. The lag portion 608 of the screw provides a shank by which the drill chuck 604 can grip the mandrel 601. To establish the correct alignment of the ear and the drill, the ear is first "debutted" by cutting the stem 609 off the ear at more-or-less right angles to the axis of the ear, producing a flat end 610. The mandrel 601 is secured then to the drill chuck 604, and the mandrel is screwed into the end 610 by operation of the drill 603 until the collar 606 comes into contact with the end 610. The collar 606 helps to assure that the screw will not keep advancing into the corn as it is processed and that the corn will be forced to rotate along with the mandrel.

Figure 7:
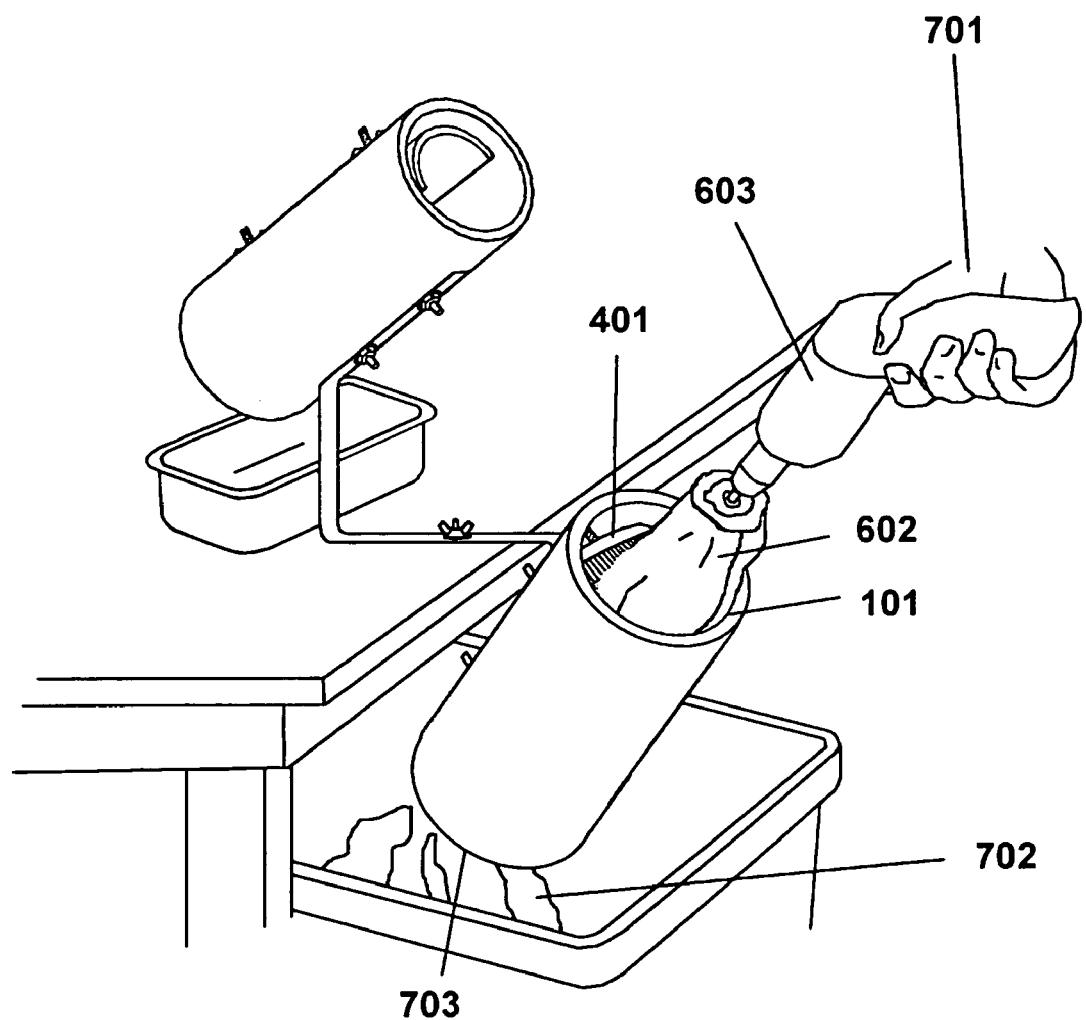
FIG. 7 is a perspective view of the preferred embodiment being used to husk an ear of corn.

FIG. 7 is a perspective view of the preferred embodiment being used to husk an ear of corn. User 701 turns on the drill 603 and inserts the ear 602 into the husking tube 101. As the ear enters the tube, it comes into contact with the brush 401. As the ear 602 revolves against the brush 401, the husk leaves 702 are brushed from the ear 602 and fall out of the bottom end 703 of the tube 101. This brushing action to remove the husk has proved by experience to be very efficient, yet not damaging to the kernels. It also effectively removes the corn silk (not shown).

Figure 8:
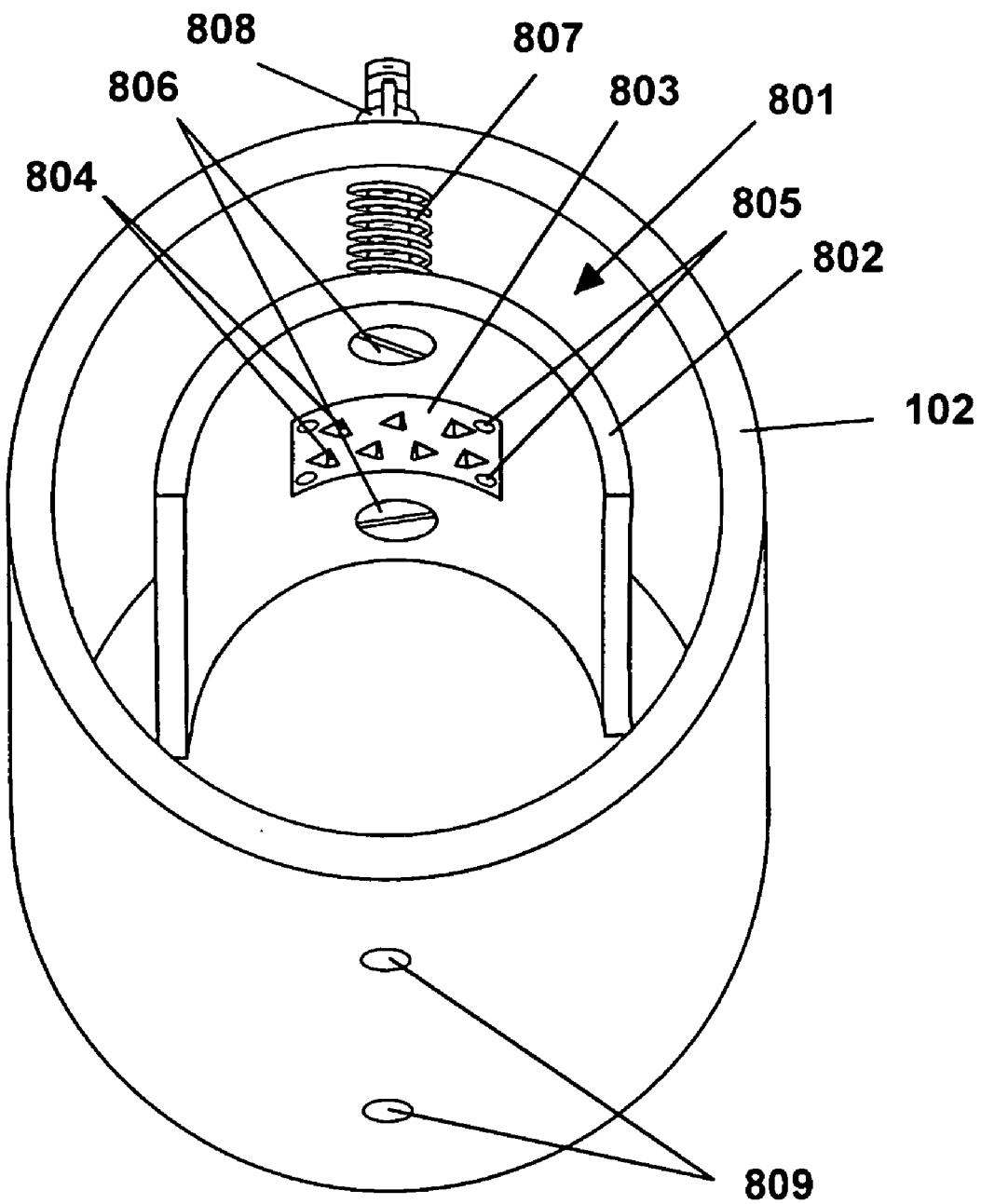
FIG. 8 is a front view of the shelling tube of the preferred embodiment. This tube, as configured here, if taken by itself is a distinct embodiment of the invention.

FIG. 8 is a front view of the shelling tube 102 of the invention, which together with the bracket and husking tube (not shown) comprises the preferred embodiment of the invention, but by itself comprises an alternate embodiment. The shelling tube 102 comprises a curved cutter head 801 resiliently suspended inside it. In the preferred embodiment of the invented apparatus, the cutter head 801 further comprises a partial cylinder 802 of thermoplastic into which a grater 803 is set. The grater is in this case a piece of sheet metal stamped to as to provide a plurality of triangular points 804. The grater 803 may be fixed to the partial cylinder by rivets or other means. A portion of the partial cylinder 802 behind the grater 803 may optionally be cut out for ease of cleaning. The cutter head 801 is suspended inside the tube 102 by two spring-biased bolts 806. The bolts each compress a spring 807 between the inner wall of the tube 102 and the partial cylinder 802, the compression of which is set by wing nuts 808 (only one shown, the other hidden behind it). Mounting holes 809 for connecting the bracket (not shown) to the tube 102 are shown opposite the cutter head 801.

Figure 9:
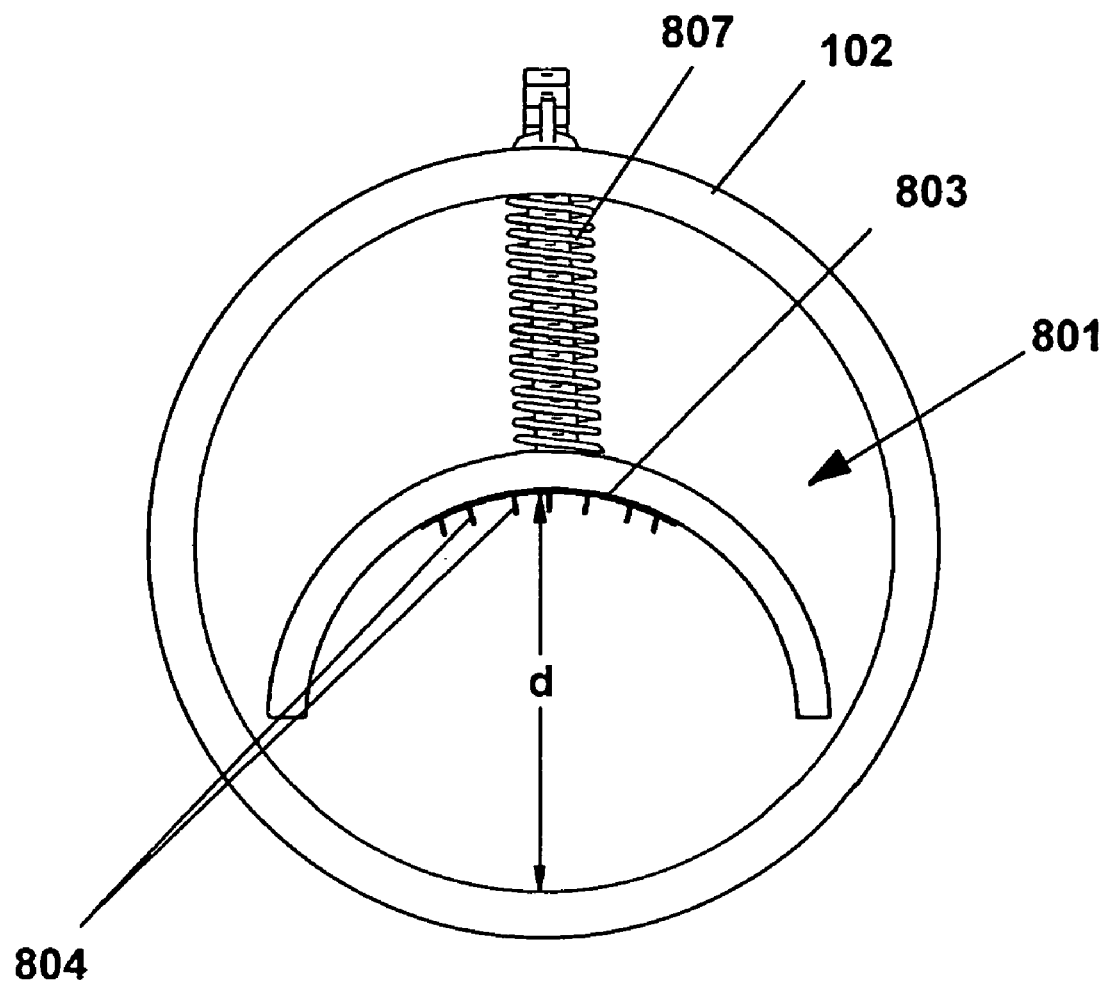
FIG. 9 is a view of the shelling tube looking straight down the tube to reveal detail.

FIG. 9 is a view of the shelling tube 102 of either embodiment looking straight down the tube to better show the cutting points 804 of the grater 803 protruding towards the center of the tube 102. Note that the cutting points 804 show as lines here because the creases along which they are bent out by stamping are parallel to axis of the tube 102. This means that the plane surfaces of the points 804 are parallel to the axis of the tube 102, so that the widest face of each point is against in the direction of rotation of the corn (not shown). This has significance, as explained further below. Note also that the distance between the grater 803 and the bottom of the shelling tube 102 is at a minimum, represented by distance "d", due to the extension of spring 807 to the maximum extent allowed by wing nut 808.

Figure 10:
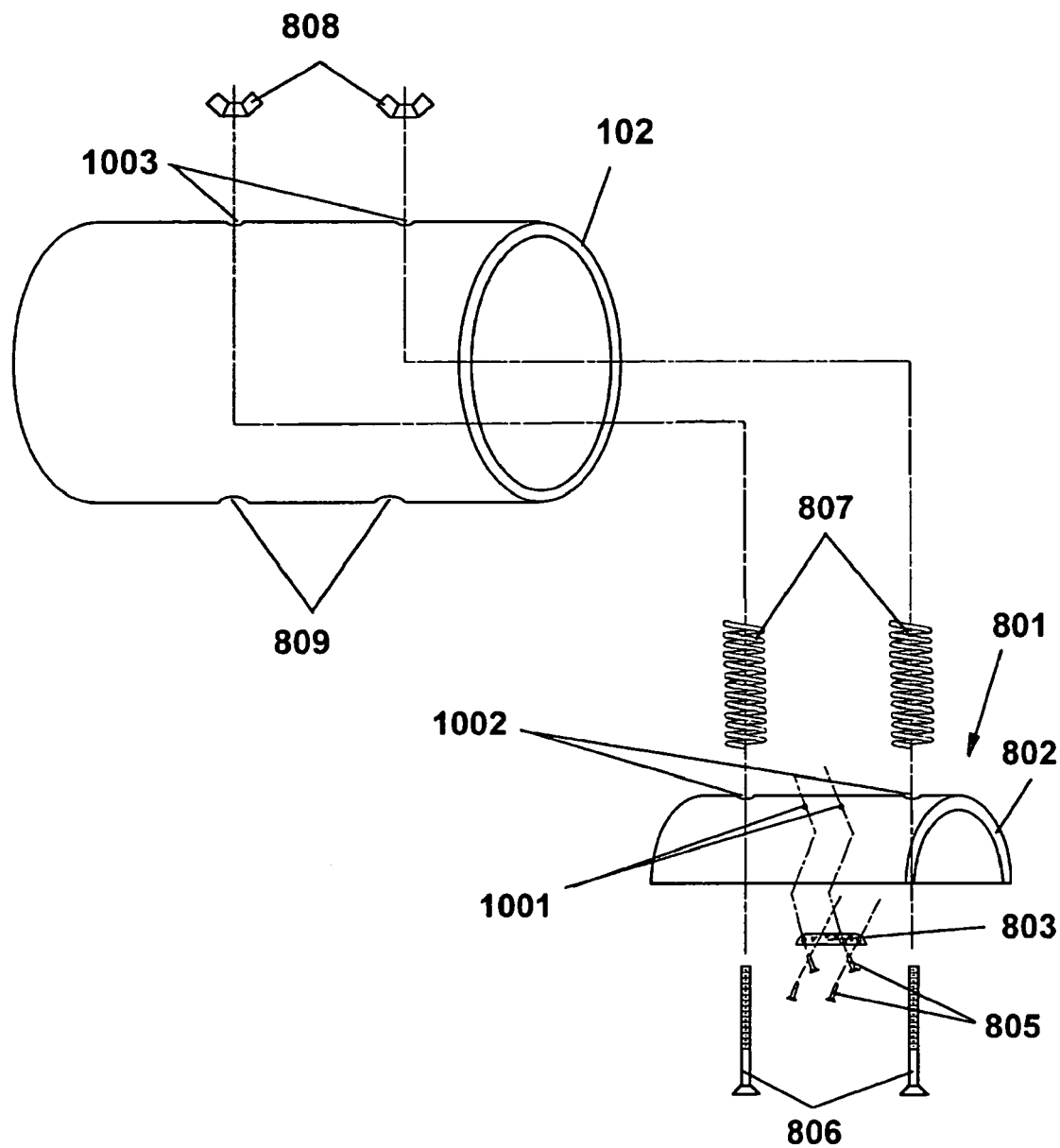
FIG. 10 is an exploded view of the shelling tube.

FIG. 10 is an exploded view of the shelling tube 102 better showing how the cutter head 801 is assembled into the tube. Grater 803 is affixed to partial cylinder 802 by rivets 805 through rivet holes 1001. Bolts 806 are passed through cylinder holes 1002, and springs 807 are placed over the bolts. The assembled head 801 is then set inside tube 102 so that bolts 806 pass through tube holes 1003. Wing nuts 808 are screwed onto bolts 806. The assembled shelling tube can then be affixed to the mounting bracket (not shown) through holes 809.

Figure 11:
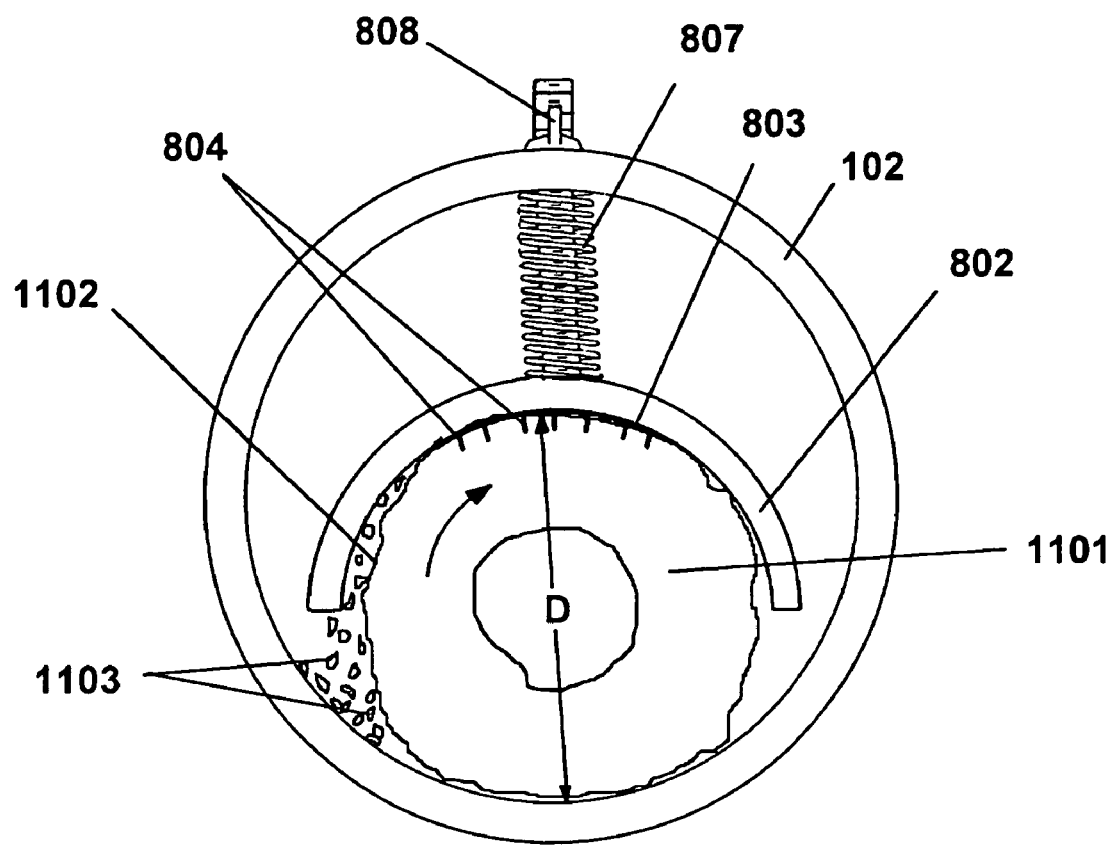
FIG. 11 is a view of the shelling tube showing fit of a husked ear of corn in it.

FIG. 11 is a view of the shelling tube 102 of the invented apparatus showing the fit of a husked ear of corn 1101 in it. (Husked ear 1101 is ear 602 after removal of the husk. It is distinct from ear 602 because it presents a corn kernel surface 1102 to grater points 804.) Typically, a power drill will turn husked ear 1101 clockwise as shown by the arrow, causing kernel surface 1102 to rotate into points 804. Points 804 will cut and dislodge kernel material as creamed corn particles 1103. Note that the distance between the grater 803 and the bottom of the shelling tube 102 has been increased to "D" by the presence of husked ear 1101. Because of the compression of spring 807, distance "D" will always be whatever the width of husked ear 1101 is, and points 804 will be maintained in contact with the kernel surface 1102. Thus, shelling of the corn will always occur without the user having to press the husked ear 1101 against the grater 803. Any pressure applied by the user other than in the axial direction (into the paper) runs the risk of twisting the ear in the mandrel, causing uneven or incomplete shelling of the ear, or inclusion of cob material in the product. With this invention, all the user has to do to shell the corn is insert the ear into the tube while the drill rotates the ear. Wing nut 808 can be adjusted to a) set the minimum diameter of husked ear that can be shelled, and b) adjust the pressure applied to a typical ear and the consistency of the shelled or creamed corn produced.

Figure 12:
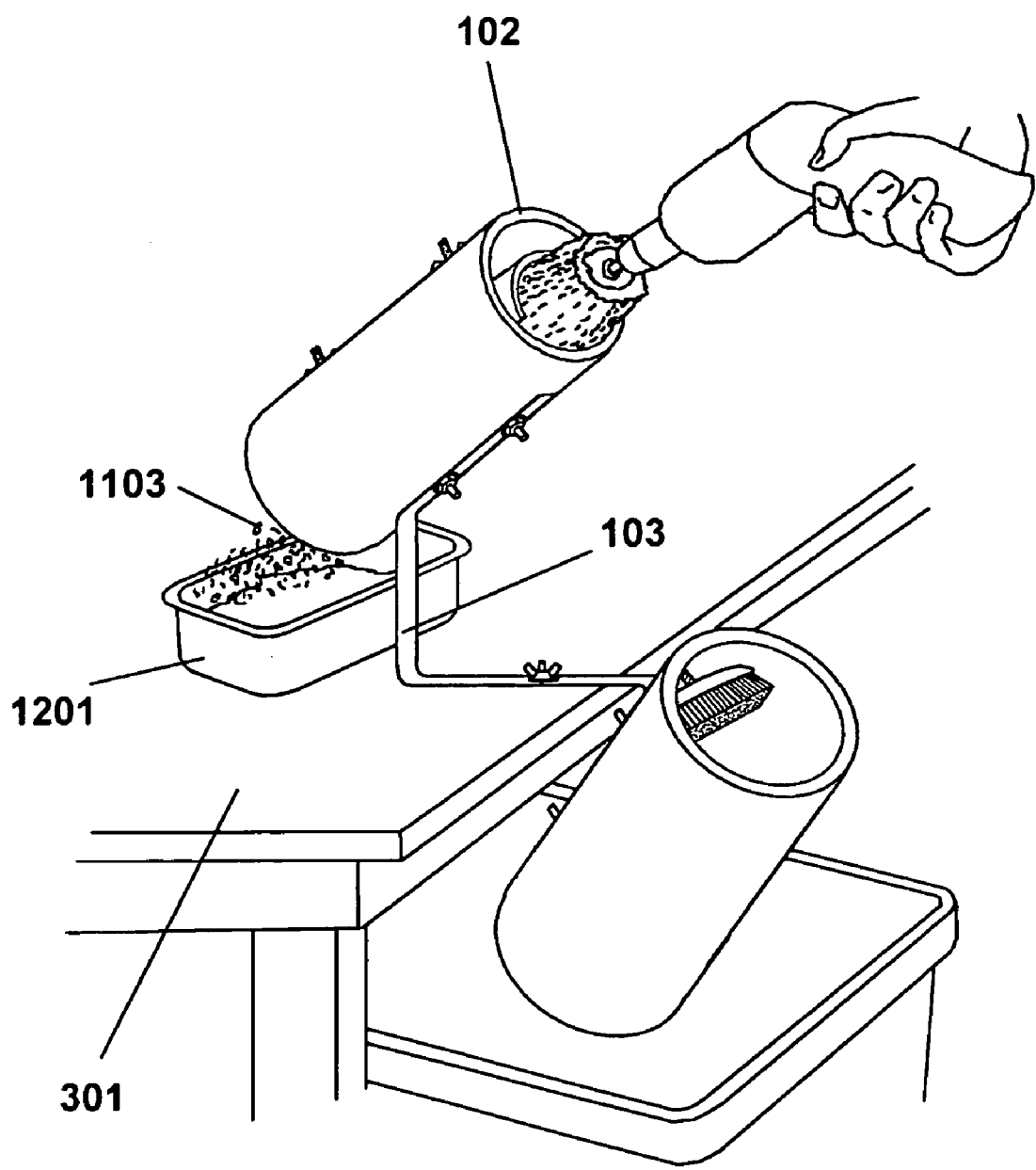
FIG. 12 is a perspective view of the preferred embodiment being used to cream and remove kernels from the cob.

FIG. 12 is a perspective view of the preferred embodiment of the invented apparatus being used to shell an husked ear of corn. Note that bracket 103 is shaped so that tube 102 is high enough above the table 301 to allow container 1201 to be positioned to catch corn particles 1103. Alternatively, the invented apparatus could be clamped to the corner of a table so that product and waste could both be collected in containers resting below the table top (not shown).

It can be seen by examining FIGS. 3, 6, 7 and 12 in sequence that the preferred embodiment can be set up readily and that by using it, complete processing of an ear of corn from having been snapped off the stalk through to creaming of the kernels can be accomplished quickly and ergonomically.

What is claimed is:

1. An apparatus for removing kernels from a husked ear of corn that is rotating about its longitudinal axis, comprising:
   a hollow tube open at both ends;
   a means for cutting the kernels from the ear;
   a means for suspending the cutting means resiliently inside the tube so that when the husked ear of corn is inserted into the tube, the cutting means is pressed against the husked ear of corn by the suspending means;
   the cutting means further comprising a partial cylinder having on its concave surface a grater, the grater further comprising sharp points extending inwardly from the partial cylinder;
   the axis of the partial cylinder being parallel to the axis of the hollow tube;
   the suspending means further comprising at least one helical spring interposed between the convex side of the partial cylinder and the inside of the hollow tube;
   the at least one helical spring being held in compression by at least one threaded fastener, the fastener extending from inside the partial cylinder, through the partial cylinder, through the center of the at least one helical spring, through the wall of the hollow tube, and into a threaded nut;
   the apparatus further comprising a mounting bracket, a means for husking corn ears, and a means for affixing corn ears coaxially to a power driver;
   the mounting bracket connecting the hollow tube with the means for husking corn ears;
   the affixing means comprising an elongate metal screw having an axis and comprising tapered threads at one end, an unthreaded shank at the other, and a flat metal collar fixed to the screw perpendicular to the axis between the tapered threads and the unthreaded shank.

2. The apparatus of claim 1 wherein:
   said mounting bracket is shaped to rest on a horizontal surface and be fastened to said hollow tube and said husking means; and
   said husking means comprises a second hollow tube open at both ends, the second hollow tube having fixed to its inner wall a bristle brush, the bristle brush being oriented within the second hollow tube so that its bristles point toward the center of the second hollow tube.

3. The apparatus of claim 2 wherein:
   said mounting bracket holds said hollow tube at a height above said horizontal surface to allow space between said hollow tube and said horizontal surface, and at an acute angle A with the ground such that the axis of said hollow tube is substantially aligned with the forearm of a user when the user is positioned before it; and
   said mounting bracket holds said second hollow tube below said hollow tube and at an acute angle with the ground greater than angle A so that the axis of said second hollow tube is substantially aligned with the forearm of the same user when the user rotates the user's forearm down at the elbow.

4. An apparatus for husking and shelling an ear of corn, the ear of corn being rotated axially by a power driver, the power driver being held by one free limb of a person, the apparatus comprising:
   a) means for fixing an ear of corn coaxially on the power driver;
   b) a first hollow tube, open at both ends, having inside the first hollow tube a partial cylinder of a radius sized to fit the surface of a typical husked ear of corn, the partial cylinder being resiliently attached inside the first hollow tube by at least one spring so that when a husked ear of corn is inserted into the first hollow tube, the partial cylinder is pressed against the surface of the husked ear of corn by the at least one spring;
   c) a second hollow tube, open at both ends, having mounted inside it fixedly a bristle brush, the bristle brush being oriented so that the bristles point towards the center of the second hollow tube; and
   d) a rigid bracket fastened to the outer surfaces of the first and second hollow tubes, the bracket being shaped to rest on a supporting surface.

5. The apparatus of claim 4 in which:
   said bracket is also shaped to hold said first and second tubes in fixed positions relative to said person such that said person can insert said ear of corn into each of said tubes by moving only said one free limb.

6. A method of husking and shelling an ear of corn with a power driver, the power driver having a chuck, the chuck gripping a mandrel by a shank, the method comprising the steps of:
   a) manually debutting an ear of corn to form a flat end perpendicular to the long axis of the ear;
   b) screwing the mandrel into the flat end of the ear, the mandrel comprising means for fastening the ear coaxially to the power driver;
   c) actuating the power driver;
   d) inserting the ear longitudinally into a husking tube while the power driver is running, the husking tube comprising a inner husking tube wall and means for frictionally removing the husk and silk from the ear;
   e) moving the ear axially in and out of the husking tube while the power driver is running, until the husk and the silk is removed from the ear;
   e) withdrawing the husked ear from the husking tube;
   f) inserting the husked ear into a shelling tube while the power driver is running, the shelling tube comprising an inner shelling tube wall and means for holding a grater in contact with the ear;
   g) moving the ear axially in and out of the shelling tube while the power driver is running, until the kernel material is removed from the ear and leaving a cob; and
   h) withdrawing the cob from the shelling tube, stopping the power driver, and unscrewing the mandrel from the cob.

7. The method of claim 6 in which:
   said means for fastening said ear coaxially to said power driver comprises a tapered screw at the end of said mandrel opposite said shank, with a flat collar in between the screw and said shank to fix the depth to which the screw drives into said flat end of said ear of corn;
   said means for frictionally removing said husk and silk from said ear comprises a bristle brush affixed to said inner husking tube wall, the bristles pointing substantially towards the center of said husking tube;
   said grater comprising a piece of sheet metal cut to fit the substantially cylindrical contour of said husked ear, the piece of sheet metal having a concave side and further comprising sharp points punched out towards the concave side; and
   said means for holding said grater in contact with said ear comprises a partial cylinder resiliently fixed inside said shelling tube, the partial cylinder having a convex side and a concave side, the convex side having at least one spring interposed between it and said inner shelling tube wall, the concave side having a concave radius large enough to accommodate a large husked ear of corn, the concave side having said grater affixed to it, the spring being of a length to hold said grater at a distance from said inner shelling tube wall opposite the spring, the distance being less than the diameter of said ear of corn, so that when said ear of corn is inserted into said shelling tube, the convex side of said partial cylinder is pushed into the spring and said sharp points are pushed into said ear.

* * * * *